United States Patent [19]

Iwasa et al.

[11] 4,442,167

[45] Apr. 10, 1984

[54] WEATHER RESISTING EXTRUDED RUBBERY ARTICLES HAVING ON THE SURFACE THEREOF A THIN LAYER OF A COLORED RUBBERY MATERIAL

[75] Inventors: Tadanobu Iwasa, Ichinomiya; Mituo Ushida, Inazawa, both of Japan

[73] Assignee: Toyoda Gosei Kabushiki Kaisha, Nishikasugaigun, Japan

[21] Appl. No.: 393,517

[22] Filed: Jun. 29, 1982

[51] Int. Cl.$^3$ .............................. B32B 5/16; B32B 3/20
[52] U.S. Cl. ..................................... 428/323; 428/334; 428/403; 428/408; 428/330; 428/494; 428/495; 428/517; 428/518; 428/904; 264/176 R
[58] Field of Search ............... 428/334, 403, 408, 329, 428/330, 495, 494, 517, 518, 323, 904, 368

[56] References Cited

U.S. PATENT DOCUMENTS

| | | | |
|---|---|---|---|
| 3,514,357 | 5/1970 | Torti et al. | 428/495 X |
| 3,543,721 | 12/1970 | Linneborn | 118/638 |
| 3,900,999 | 8/1975 | Callan | 428/495 X |
| 3,935,329 | 1/1976 | Reilly et al. | 427/35 |
| 4,005,254 | 1/1977 | Mackenzie, Jr. | 428/329 |
| 4,153,748 | 5/1979 | Bischoff | 428/494 X |

*Primary Examiner*—P. Ives
*Attorney, Agent, or Firm*—Cushman, Darby & Cushman

[57] ABSTRACT

A weather-resisting extruded rubbery article based on carbon black-incorporated EPDM rubber substrate having on the surface thereof a thin layer of a colored rubbery material of a smooth or suede-like appearance integrally formed on the substrate by extrusion molding, characterized in that the colored rubbery material has been derived from 75-0% by weight of EPDM and 25-100% by weight of a graft copolymer of EPDM and vinyl chloride together with one or more coloring fillers. The weather-resisting extruded rubbery article is manufactured by subjecting the carbon black-incorporated EPDM and a colored rubbery compound comprised of EPDM and a graft copolymer of EPDM and vinyl chloride, one or more coloring fillers, a vulcanizing system and, if necessary, a foaming agent to extrusion molding followed by vulcanization with or without simultaneous foaming and, if necessary, the extruded rubbery article thus obtained which has on the surface thereof a thin layer of a colored and foamed rubbery material integrally formed on the substrate is polished with an abrasive to remove the skin of the colored and foamed rubbery material thereby providing the surface of a suède-like appearance, characterized in that the colored rubbery compound contains 75-0% by weight of EPDM and 25-100% by weight of the graft copolymer of EPDM and vinyl chloride. The weather-resisting extruded rubbery articles are useful as parts of motor vehicles exposed under severe conditions and as indoor and outdoor ornaments and buffer materials.

8 Claims, No Drawings

WEATHER RESISTING EXTRUDED RUBBERY ARTICLES HAVING ON THE SURFACE THEREOF A THIN LAYER OF A COLORED RUBBERY MATERIAL

BACKGROUND OF THE INVENTION

Field of the Invention

The present invention relates to weather-resistant extruded rubbery articles having on the surface thereof a thin rubbery layer colored in a desired tint and to a process for manufacturing same. More particularly, the present invention relates to weather-resistant extruded articles based on ethylene-propylenediene monomer (referred to hereinafter as EPDM) rubber having on the surface thereof a thin rubbery layer of a smooth or suède-like appearance colored in a desired tint and integrally formed on the substrate as well as a process for the manufacture of such weather-resistant extruded articles wherein EPDM and a colored rubbery compound comprising EPDM and a graft copolymer of EPDM and vinyl chloride are subjected together with a vulcanizing system to extrusion molding followed by vulcanization with or without foaming, and if necessary, the foamed surface of the extruded article is polished with an abrasive.

Description of the Prior Arts

EPDM is an ethylene-propylene-diene terpolymer prepared by introducing into ethylene-propylene copolymer devoid of any polymerizable double bond in a main chain thereof a third component having an unsaturated group (such as a diene monomer) to make the copolymer capable of being vulcanized with sulfur. As EPDM possesses excellent resisting properties to ozone, heat and weathering action, it is widely utilized as a rubbery material, especially for manufacturing various parts of motor vehicles, such as automotive windshield weatherstrip, glass run channel, door sponge rubber and weatherstrip. EPDM rubber used for these parts are colored in black because of compounding with carbon black for enhancing weather-resistance or the like valuable properties. Thus, the color of EPDM rubber used for these auto parts is exclusively black due to the carbon black filler.

In recent years, EPDM rubber articles colored in various kinds of tint have increasingly been required to satisfy users' versatile needs. For manufacturing EPDM rubber colored in various kinds of tint, it is necessary to incorporate EPDM with a variety of colored fillers, for example, calcium carbonate or clay as a white-colored filler in place of carbon black. In addition to needs for versatility in tint of EPDM rubber articles, it is also required for these articles to have a fabric-like or suède-like appearance. For modifying the surface of EPDM rubber articles to have such appearance, it has long been considered to apply a colored fabric sheet onto the surface of the black-colored EPDM rubber substrate or to make planting of colored fibers on the surface of the substrate. However, this requires on the surface of the extruded and vulcanized EPDM rubber substrate a series of complicated and troublesome steps of buffing, washing, application of a binder, application of a fabric sheet (or fiber planting), and drying which necessarily increases the production cost as a whole. Further, it is difficult to apply a binder or fabric uniformly in compliance with the complicated structure of the substrate, thus creating a problem in quality control. An ordinary fiber planting device is already known (U.S. Pat. No. 3,543,721) but application of this art to rubber to obtain a suède-like appearance is not known. It is also expected that a colored EPDM rubber is foamed on the surface thereof after extrusion and vulcanization and the skin of the foam is removed by polishing with an abrasive to obtain a suède-like appearance. For realizing this, it is necessary, as described above, to incorporate EPDM with not only a foaming agent but also a variety of colored fillers or pigments in place of carbon black and to foam EPDM after extrusion.

However, a colored EPDM rubber free from carbon black is poor in weather resistance. Thus, a non-staining age-resistor, an UV-absorbing agent and a light stabilizer have been incorporated singly or in combination into the colored EPDM rubber to overcome the above disadvantage but without the expected results.

On the other hand, application of a paint or the like coloring agent onto the surface of carbon black-incorporated EPDM rubber is already proposed as a means for coloring the black EPDM rubber. In this case, however, such paint generally forms a rigid film on the surface of the rubber, thus deteriorating flexibility of the rubber. Although some paints leave a flexible film, such paints are generally inferior in weather resistance. Thus, many problems to be solved are involved in such a direct coloring method for carbon black-incorporated EPDM rubber.

Thus, any successful result has not yet been reported hitherto in the above mentioned various methods with respect to coloring of carbon black-incorporated EPDM rubber.

Reported recently for coloring EPDM rubber is a chemical modification method wherein the surface of EPDM rubber is halogenated and a paint is then applied to the surface (U.S. Pat. No. 3,935,329). However, at least one of the advantageous properties of carbon black-incorporated EPDM rubber is damaged even in the case of using this chemical method. In general, a layer of a coloring material applied onto black-colored EPDM rubber tends to cause delamination or damage the inherent useful properties, e.g. weather-resisting property, flexibility, etc., of carbon black-incorporated EPDM rubber. On the other hand, incorporation of EPDM rubber with a coloring filler in place of carbon black has already proved to be undesirable in view of serious deterioration of the useful properties of EPDM rubber. Thus, any layer or film applied onto carbon black-incorporated EPDM rubber for the purpose of coloring should be thin enough lest the inherent useful properties of the rubber should be damaged.

Accordingly, there is a great demand for developing a new method for coloring carbon black-incorporated EPDM rubber without deterioration of the inherent useful properties of the rubber.

BRIEF DESCRIPTION OF THE INVENTION

It is an object of the present invention to provide weather-resisting extruded rubbery articles having on the surface thereof a thin smooth rubbery layer colored in a desired tint.

It is another object of the present invention to provide weather-resisting extruded rubbery articles having on the surface thereof a thin rubbery layer of a suède-like appearance colored in a desired tint.

It is still another object of the present invention to provide weather-resisting extruded articles based on carbon black-incorporated EPDM rubber substrate having on the surface thereof a rubbery layer as thin as 1 mm or less of a smooth or suède-like appearance colored in a desired tint and integrally formed on the substrate without damaging the inherent useful properties of carbon black-incorporated EPDM rubber.

It is further object of the present invention to provide a process for the manufacture of weather-resisting extruded rubbery articles having on the surface thereof a thin smooth rubbery layer colored in a desired tint wherein EPDM and a colored rubbery compound comprising EPDM and a graft copolymer of EPDM and vinyl chloride are subjected together with a vulcanizing system to extrusion molding followed by vulcanization.

It is still further object of the present invention to provide a process for the manufacture of weather-resisting extruded rubbery articles having on the surface thereof a thin rubbery layer of suède-like appearance colored in a desired tint wherein EPDM and a colored rubbery compound comprising EPDM and a graft copolymer of EPDM and vinyl chloride are subjected together with a vulcanizing system and a foaming agent to extrusion molding followed by vulcanization with foaming, and thereafter the foamed surface of the extruded article is polished with an abrasive.

Other and further objects, features and advantages of the present invention will become apparent more fully from the following description.

DETAILED DESCRIPTION OF THE INVENTION

The present inventors have been made extensive researches on the types, compositions and physicochemical characteristics of rubbery material to be applied in the form of a thin layer onto the surface of carbon black-incorporated EPDM substrate for the purpose of coloring and on methods for manufacturing extruded articles based on a carbon black-incorporated EPDM rubber substrate having on the surface thereof a thin layer of a smooth of suède-like appearance colored in a desired tint. As a result of the extensive researches, it has now been found surprisingly that when a colored rubbery compound comprising EPDM and a specific graft copolymer in a specific ratio is used as a rubbery material to be applied onto the surface of carbon black-incorporated EPDM rubber substrate, such colored rubbery compound can be formed integrally as a thin layer of the substrate without damaging the inherent useful properties of the substrate. It has also been found that when the colored rubbery compound is incorporated with a foaming agent, the colored rubbery compound integrally formed as a thin layer of the surface of the extruded article can be foamed simultaneously with valcanization and the skin of the foamed thin layer can be removed by polishing with an abrasive to obtain an extruded article based on EPDM rubber having on the surface thereof a thin rubbery layer of a suède-like appearance colored in a desired tint. This invention has been accomplished on the basis of the above finding.

In accordance with one embodiment of the present invention, there is provided a weather-resisting extruded rubbery article based on carbon black-incorporated EPDM rubber substrate having on the surface thereof a thin layer of a colored rubbery material of a smooth or suède-like appearance integrally formed on the substrate by extrusion molding, characterized in that the colored rubbery material has been derived from 75-0% by weight of EPDM and 25-100% by weight of a graft copolymer of EPDM and vinyl chloride together with one or more coloring fillers.

In accordance with another embodiment of the present invention, there is provided a process for the manufacture of a weather-resisting extruded rubbery article based on carbon black-incorporated EPDM rubber substrate having on the surface thereof a thin layer of a colored rubbery material of a smooth or suède-like appearance integrally formed on the substrate, which comprises subjecting the carbon black-incorporated EPDM and a colored rubbery compound comprised of EPDM and a graft copolymer of EPDM and vinyl chloride, one or more coloring fillers, a vulcanizing system and, if necessary, a foaming agent to extrusion molding followed by vulcanization with or without simultaneous foaming and, if necessary, the extruded rubbery article thus obtained which has on the surface thereof a thin layer of a colored and foamed rubbery material integrally formed on the substrate is polished with an abrasive to remove the skin of the colored and foamed rubbery material thereby providing the surface of a suède-like appearance, characterized in that the colored rubbery compound contains 75-0% by weight of EPDM and 25-100% by weight of a graft copolymer of EPDM and vinyl chloride.

Carbon black-incorporated EPDM is black in color. As compared with the carbon black-incorporated or black-colored EPDM, EPDM colored with a coloring filler is inferior in extrusive processability so that it was quite impossible in the prior arts to form a thin layer of the colored EPDM on the black-colored EPDM substrate by extrusion molding to mask the black color of the substrate by a different color of the thin layer formed thereon. It is quite surprising therefore that an extruded article based on carbon black-incorporated EPDM rubber substrate having on the surface thereof a thin layer of a colored rubbery material integrally formed on the substrate can be obtained by the present invention. It is possible according to the present invention to obtain an extruded article of a suède-like appearance colored in a desired tint by incorporating the specific colored rubbery compound with a foaming agent to effect foaming simultaneously vulcanization and removing the skin of the foamed thin layer with an abrasive.

It is one of the characteristic feature of this invention to use a specific colored rubbery compound wherein at most 75% by weight (75-0% by weight) of EPDM and at least 25% by weight (25-100% by weight) of a graft copolymer of EPDM and vinyl chloride are contained. If the proportion of EPDM becomes greater than 75% by weight, (this means that the proportion of the graft copolymer becomes smaller than 25% by weight) the extrusion characteristics of the colored rubbery compound become bad so that the compound cannot be extruded in the form of a thin layer. In addition, a high proportion of EPDM exceeding 75% by weight makes weather-resistance of the colored thin layer inferior so that cracks tend to form in the colored thin layer during exposure to weathering conditions. From the economical point of view, a good result is obtained when EPDM is used in a higher proportion such as 50% by weight.

The graft copolymer of EPDM and vinyl chloride can be prepared according to a conventional method by graft-polymerizing vinyl chloride in the presence of EPDM. In the present invention, the proportion of EPDM in the graft copolymer should in principle be limited to 4–60% by weight, If the EPDM content in the graft copolymer is smaller than 4% by weight, the graft copolymer will be deteriorated in compatibility with EPDM on compounding of these ingredients and will be reduced in its own rubber-like elasticity. On the other hand, if the EPDM content becomes greater than 60% by weight, the graft copolymer will be deteriorated in weather-resistance.

Any type of EPDM can be utilized for this invention. Preferable examples of EPDM include ethylene-propylene-butadiene and ethylene-propylene-dicyclopentadiene.

The colored rubbery compound involves, in addition to EPDM and the graft copolymer, one or more coloring fillers or pigments or organic or inorganic nature. According to users' requirements for tint (color itself and tone), the coloring fillers are properly selected among inorganic or organic pigments possessing good resistance to weathering action, heat and chemicals. Typical pigments include, for example, calcium carbonate, titanium dioxide, red oxide, chronium oxide, titanium yellow, Benzidine Yellow, Hanza Yellow, Permanent Red, Phthalocyanine Blue, Lake Red C, Brilliant Carmine 6B, Permanent Yellow HR, etc.

If necessary, a small amount of carbon black is also used as coloring filler to adjust the color tone. The color concentration (tone) can be adjusted by selecting a particular pigment or controlling the amount of pigment or pigments to be compounded.

Plasticizers, stabilizers, vulcanizing agents, vulcanization accelerators, UV-absorbing agents utilizable in this invention are suitably selected from conventional ones. For example, plasticizers to be added to the colored rubbery compound are suitably selected from those conventionally employed for polyvinyl chloride, such as phthalates, dibasic acid esters, glycol esters and epoxy compounds. Preferable are dioctyl phthalate (DOP) and the like dialkyl phthalates such as DMP, DEP, DIBP and DBP; dialkyl succinates such as DIDS; diethylene glycol dibenzoate; alkyl phosphates such as tricresyl phosphate (TCP); and epoxy soybean oil (ESO) and epoxy linseed oil (ELO). Preferable as stabilizers are organotin compounds (tin-type stabilizers) such as dibutyltin dilaurate, and metal soaps. Usual inorganic or organic peroxides and sulfur-type vulcanizers are used as vulcanizing or curing agents. Conventinal UV-absorbing or UV-protecting agents such as those of aromatic series (benzoates or benzophenones) widely used in polymer industry can also be utilized for this invention. These additives are used in an amount generally recommended in conventional methods.

The extruded rubbery articles of this invention are manufactured by first preparing a colored rubbery compound comprised of EPDM and the graft copolymer in a specific proportion, one or more coloring fillers in amounts necessary to give a desired tint, and one or more additives above mentioned, subjecting carbon black-incorporated EPDM and the colored rubbery compound together with a vulcanizing system consisting of a vulcanizer and a vulcanization accelerator to extrusion molding, and thereafter vulcanizing the extruded article, for example, by heating. An extruded rubbery article based on carbon black-incorporated EPDM rubber substrate having on the surface thereof a thin layer of a colored rubbery material integrally formed on the substrate is thus obtained. In this case, it is preferable to make the colored layer as thin as possible, usually less than 1 mm in thickness. When the colored layer is less than 1 mm in thickness, deterioration in flexibility due to the coloring filler is scarcely detected. In case of incorporating EPDM with a coloring filler, however, the prior art has been unable to reduce the thickness of the colored layer to less than 1 mm on extrusion molding.

On extrusion molding of rubbery articles, a crosshead type extruder, for example, is advantageously utilized whereby the black-colored EPDM substrate is extruded together with a colored thin layer coated thereon. The color layer as thin as 1 mm or less is sufficient enough to mask the black color of the carbon black-incorporated EPDM substrate.

In case a suède-like appearance is desired on the surface of the colored thin layer, the colored rubbery compound is incorporated with a foaming agent as an additional ingredient which can foam the colored thin layer simultaneously with vulcanization on heating. For this purpose, conventional foaming agents capable of foaming under heat can be used, such as azodicarboxyamide (ADCA), dinitrosopentamethylenetetramine (DPT) and 4,4'oxy-bis-benzensulfonyl hydrazide (OBSH). These foaming agents can be used in an amount sufficient to afford a foaming ratio of 1.2–10 according to the required condition for a suède-like appearance. The colored and foamed thin layer is then subjected to a conventional polishing or cutting treatment with an abrasive whereby the skin of the foamed layer is rubbed off to leave the surface of a suède-like appearance.

The extruded rubbery articles of the present invention have durable color on the flexible substrate and show good elasticity against mechanical deformation and strong resistance to weathering action. In summary, the following technical merits can be achieved by the present invention:

(1) It is known that EPDM rubber colored with a coloring filler other than carbon black cannot be extruded into a thin layer of 1 mm or less in thickness. If the thickness of the colored layer is greater than 1 mm, flexibility and weather-resistance of the layer are seriously deteriorated. According to the present invention, on the other hand, the colored layer can be extruded into a thin layer of 1 mm or less (even 0.5 mm) in thickness. Thus, an extremely thin foamed layer can also be obtained when the colored rubbery compound contains a foaming agent.

(2) Since the formation of a thin layer as referred to the preceding (1) is possible, consumption of the necessary ingredients is significantly saved, thus bringing about a high economical advantage. The expenses needed for manufacturing the product can be reduced remarkably.

(3) The material constituting the thin layer is excellent in physical properties. As the material reduces their viscosity at a higher temperature, it exhibits good moldability, extrusive processability and foamability.

(4) Adhesiveness of the rubbery material constituting the thin layer to the substrate material is excellent. Thus, no delamination nor ply separation occurs between them.

(5) The rubbery material of the thin layer is almost equivalent in elongation to the substrate material and is excellent in flexibility.

(6) No crack is formed in a bending test of the extruded products after exposure to weathering action. This means that the extruded products of this invention are excellent in weather-resistance.

Thus, the extruded articles of the present invention are especially useful as parts of motor vehicles exposed under severe conditions. Besides these applications, the products of the present invention are also useful as indoor and outdoor ornaments and buffer materials.

The present invention will now be illustrated in more detail by way of examples wherein the test samples derived from Experiment Nos. 1-6 are of the present invention while those derived from Comparative Experiment Nos. 1-5 are given for the purpose of comparison.

EXAMPLE 1

(1) Preparation of a rubbery sheet material for a colored thin layer:

A graft copolymer of EPDM and vinyl chloride (VC) used as a rubbery material for a colored thin layer had the following composition:

EPDM: ethylene-propylene-dicyclopentadiene having an $M_{1+4}^{100°\ C.}$ value of 20, an iodine number of 5 and a propylene content of 38% by weight VC: content 70% by weight Graft ratio: 60%

In a BR-type Banbury mixer preheated at 180° C. and rotated at a velocity of 70 rpm were placed a mixture of 100 parts by weight of the above graft copolymer, 30 parts by weight of a plasticizer (DOP) and 2 parts by weight of a tin type stabilizer. The mixture was kneaded for 5–8 minutes and, after confirming the molten state of the mixture, cooled and shaped into a sheet (referred to hereinafter as Composition A) with 8 inch rolls at 100° C., 20/25 rpm and a nip of 2 mm.

(2) Proportion of EPDM to the rubbery sheet material for a colored thin layer:

(a) In Experiment Nos. 1–6, the proportion (parts by weight) of EPDM to the Composition A was shown in Table A below.

TABLE A

| Ingredient | Exp. No. | | | | | |
|---|---|---|---|---|---|---|
| | 1 | 2 | 3 | 4 | 5 | 6 |
| EPDM (JSR EP 35) | 91 | 83 | 70 | 59 | 37 | 0 |
| Composition A | 40 | 74 | 123 | 181 | 277 | 440 |

(b) For the purpose of comparison, 100 parts by weight of EPDM alone was used in Comparative Experiment Nos. 1–5 with conventional additives. The proportion of the EPDM to these additives is shown in Table B.

TABLE B

| Additive to EPDM | Comparative Exp. No. | | | | |
|---|---|---|---|---|---|
| | 1 | 2 | 3 | 4 | 5 |
| A | — | 1 | 1 | 1 | 1 |
| B | — | 0.5 | 0.5 | — | — |
| C | — | — | — | 0.5 | 0.5 |
| D | — | 0.5 | 0.5 | 0.5 | — |
| E | — | — | — | — | 0.5 |
| F | — | 0.5 | — | — | — |
| G | — | — | 0.5 | — | 0.5 |

Details of the additive to be added to the EPDM are shown in Table C.

(3) Compounding of fillers (coloring agents, etc.) and a vulcanizing system:

In each of Experiment Nos. 1–6 and Comparative Experiment Nos. 1–5, the material was compounded with the following ingredients (conventional additives, coloring fillers and vulcanizing system) according to a method as will be described herinafter.

| Ingredient | Parts by weight |
|---|---|
| Calcined clay* | 90 |
| Process oil (paraffin type) | 20 |
| $TiO_2$ (rutile type) | 10 |

TABLE C

| | Additive | Chemical nomenclature | Trade name |
|---|---|---|---|
| A | age resistor | tetraxis [methylene (3,5-di-tert-butyl-4-hydroxyhydrocinnamate)]methane | Irganox 1010 (Ciba-Geigy) |
| B | stabilizer | tri(nonyl phenyl)phosphite | Sumilizer TNP (Sumitomo Chemical) |
| C | stabilizer | dilauryl thiodipropionate | Sumilizer TPL (Sumitomo Chemical) |
| D | ultra-violet light absorber | 2(2'-hydroxy-3',5'-di-tert-butyl)-5-chlorobenzotriazole | Tinuvin 327 (Ciba-Geigy) |
| E | ultra-violet light absorber | 2-hydroxy-4-octyloxybenzophenone | Seesorb 102 (Shiraishi Industry) |
| F | light stabilizer | 3,5-di-tert-butyl-4-hydroxybenzylmonoethyl-phosphonate (2:1) nickel chelate compound | Irgastab 2002 (Ciba-Geigy) |
| G | light stabilizer | benzoate derivative | Tinuvin 120 (Ciba-Geigy) |

| | |
|---|---|
| Zinc oxide | 5 |
| Stearic acid | 1 |
| Diethylene glycol | 1 |
| Vulcanization accelerator MBT | 1 |
| Vulcanization accelerator TMTD | 1 |
| Vulcanization accelerator ZnBDC | 1.5 |
| Sulfur | 2 |

*Satintone No. 1 (manufactured by Engelhand Mineral & Chem.)

In each of Experiment Nos. 1–6 and Comparative experiment Nos. 1–5, EPDM or a blend of EPDM and Composition A was kneaded for 5 minutes at 100°–120° C. with 8 inch rolls at 20/25 rpm and a nip of 1 mm. After adjusting a nip to 3 mm, the above mentioned additives and fillers were compounded and the mixture was kneaded for 15 minutes. The roll temperature was cooled at 50° C. and the mixture was then compounded with the vulcanizing system (sulfur and the vulcanization accelerators) in 3–5 minutes at a nip of 3 mm. The roll nip was then adjusted to 0.5 mm and the mixture was thinly passed therethrough twice. The roll nip was again adjusted to 3 mm and the mixture was taken out portionwise.

(4) Extrusive processability of the colored rubbery compounds:

The rubbery compounds thus extruded were colored in white due to the white fillers. These rubbery compounds were used as samples for checking extrusive processability and subjected to measurement of their Mooney viscosities and extrusion characteristics. A result of the measurement is shown in Table 1. The values of the extrusion characteristics shown in Table 1 were measured in accordance with the method of ASTM D-2330 wherein the samples were tested with a Garvey die defined in ASTM D-2330 at a die temperature of 80° C., a head temperature of 70° C., a barrel temperature of 60° C., a screw temperature of 40° C. and an extrusion rate of 5 m/min.

in the preceding (3) were used for the preparation of a colored rubber as the colored thin layer. Using an ordinary crosshead-type extruder (L/D=10, 75$\phi$ for the substrate; L/D=6, 40$\phi$ for the thin layer), the carbon black-incorporated EPDM compound and the colored rubbery compounds were extruded under the conditions including a die temperature of 80° C., a head temperature of 70° C., a barrel temperature of 60° C., a screw temperature of 40° C. and an extrusion rate of 5 m/5 min to yield extruded rubbery products with white-colored rubbery thin layers integrally formed on the black substrate thereof. The extruded products were then cured for 30 minutes at 160° C. in a steam vulcaniz-

TABLE 1

| | Exp. No. | | | | | | Comparative Exp. No. | | | | |
|---|---|---|---|---|---|---|---|---|---|---|---|
| | 1 | 2 | 3 | 4 | 5 | 6 | 1 | 2 | 3 | 4 | 5 |
| Mooney viscosity $ML_{1+4}100°$ C. | 62 | 54 | 50 | 42 | 38 | 34 | 70 | 68 | 65 | 65 | 67 |
| Extrusion characteristics | 4,3,2,2 | 4,3,3,2 | 4,4,3,3 | 4,4,4,4 | 4,4,4,4 | 4,4,4,4 | 3,1,1,2 | 3,1,1,2 | 3,1,1,2 | 3,1,1,2 | 3,1,1,2 |

(5) Weather resistance of the colored rubbery compounds after curing:

The colored rubbery compounds were further subjected to press cure at 170° C. for 15 minutes to prepare samples for checking weather resistance. Table 2 shows a result of the measurement of weather resistance made on these samples.

(6) Manufacture of the extruded rubbery products of this invention:

ing can. By employing, if desired, red oxide, a phthalocyanine dye or the like coloring filler in the above method, an extruded rubbery article colored in a different tint can be obtained.

(7) Thickness, adhesiveness and weather resistance of the colored rubbery thin layer:

In each case of using the colored rubbery compounds of Experiment Nos. 1-6 and Comparative Experiment Nos. 1-5, the extruded product was examined to check

TABLE 2

| | Exp. No. | | | | | | Comparative Exp. No. | | | | |
|---|---|---|---|---|---|---|---|---|---|---|---|
| | 1 | 2 | 3 | 4 | 5 | 6 | 1 | 2 | 3 | 4 | 5 |
| Tension test (JIS K-6301) | | | | | | | | | | | |
| $M_{100}$ (kg/cm$^2$) | 23 | 25 | 28 | 35 | 44 | 53 | 17 | 15 | 13 | 13 | 14 |
| $T_B$ (kg/cm$^2$) | 85 | 88 | 82 | 75 | 65 | 68 | 63 | 62 | 61 | 62 | 60 |
| $E_B$ (%) | 380 | 340 | 300 | 260 | 140 | 120 | 420 | 410 | 420 | 440 | 440 |
| $H_S$ (JIS -A) | 68 | 73 | 80 | 87 | 93 | 97 | 60 | 58 | 58 | 57 | 58 |
| Weather resistance test[1] | | | | | | | | | | | |
| $\Delta T_B$ (%) | −23 | −19 | −4 | 0 | +8 | +12 | −32 | −30 | −38 | −30 | −33 |
| $\Delta E_B$ (%) | −24 | −21 | −12 | −8 | 0 | +5 | −36 | −28 | −39 | −25 | −37 |
| $\Delta H_S$ | +7 | +4 | +3 | +2 | +1 | +1 | +10 | +8 | +10 | +7 | +10 |
| Weather resistance test[2] | | | | | | | | | | | |
| $\Delta T_B$ (%) | −27 | −19 | +5 | +6 | +13 | +28 | −31 | −30 | −35 | −29 | −32 |
| $\Delta E_B$ (%) | −40 | −38 | −25 | −17 | 0 | +2 | −47 | −42 | −50 | −40 | −47 |
| $\Delta H_S$ | +6 | +5 | +4 | +3 | +3 | +1 | +8 | +7 | +9 | +6 | +8 |

Remarks:
[1]a WEL-SUN-HCE type weather meter (manufactured by Suga Test Instruments Co., Japan): wet method, 200 hour irradiation
[2]a UV-fade-o-meter FAL-3 Model (manufactured by Suga Test Instruments Co., Japan): 200 hour irradiation A carbon black-incorporated EPDM compound utilizable for the preparation of a black rubber as the substrate had a composition as shown below.

| Ingredient | Parts by weight |
|---|---|
| EPDM (JSR EP 57C) | 100 |
| MAF carbon black | 130 |
| Process oil (paraffin type) | 100 |
| Zinc oxide | 5 |
| Stearic acid | 1 |
| Vulcanization accelerator MBT | 1 |
| Vulcanization accelerator TMTD | 1 |
| Vulcanization accelerator ZnBDC | 1.5 |
| Sulfur | 2 |

The colored rubbery compounds of Experiment Nos. 1-6 and Comparative Experiment Nos. 1-5 referred to (a) the thickness of the colored thin layer, (b) adhesiveness of the colored thin layer to the black rubbery substrate and (c) any formation of crack on bending of the extruded product at 90° after weather-resistance test.

(a) Thickness of the colored thin layer:
The thickness of the colored thin layer was as shown in Table 3.

TABLE 3

| Colored rubbery compound | Experiment Nos. | | | | | | Comparative Experiment Nos. | | | | |
|---|---|---|---|---|---|---|---|---|---|---|---|
| | 1 | 2 | 3 | 4 | 5 | 6 | 1 | 2 | 3 | 4 | 5 |
| Thickness of the colored thin | 0.7 | 0.6 | 0.5 | 0.4 | 0.4 | 0.3 mm | 2.3 | 2.1 | 2.2 | 2.0 | 2.1 mm |

TABLE 3-continued

| Colored rubbery compound layer | Experiment Nos. | | | | | | Comparative Experiment Nos. | | | | |
|---|---|---|---|---|---|---|---|---|---|---|---|
| | 1 | 2 | 3 | 4 | 5 | 6 | 1 | 2 | 3 | 4 | 5 |

In case of using the colored rubbery compounds of Experiment Nos. 1-6, the colored layer in the extruded product could be thinner than 1 mm. In case of using the colored rubbery compounds of Comparative Experiment Nos. 1-5, however, the colored layer in the extruded product could not be extruded with a thickness less than 1 mm.

(b) Adhesiveness of the colored thin layer to the rubbery substrate:

In all of the cases of using the colored rubbery compounds of Experiment Nos. 1-6 and Comparative Experiment Nos. 1-5, adhesiveness of the colored thin layer to the black rubbery substrate was outstanding so that any delamination or ply separation was not observed on adhesion tests.

(c) Bending test of the products after weathering action:

On bending of the extruded products at 90° after a weather-resistance test conducted by a wet method wherein a WEL-SUN-HCE type weather meter (manufactured by Suga Test Instruments Co., Japan) was used for 200 hour irradiation, no crack was observed in the products obtained in case of using the colored rubbery compounds of Experiment Nos. 1-6. This apparently means that the products of this invention are excellent in flexibility. Contrary to this, the formation of cracks was observed in all of the products obtained in case of using the colored rubbery compounds of Comparative Experiment Nos. 1-5.

EXAMPLE 2

(1) Preparation of the colored rubbery compounds:

The Composition A used in Example 1 was blended with EPDM (JSR EP 35) in the same proportion as tabulated in Table A to prepare the same materials as described in (2)-(a) of Example 1 (Experiment Nos. 1-6).

For the purpose of comparison, EPDM alone was incorporated with additives as tabulated in Table B and C to prepare the same materials as described in (2)-(b) of Example 1 (Comparative Experiment Nos. 1-6).

The individual materials of Experiment Nos. 1-6 and Comparative Experiment Nos. 1-5 were compounded with the following ingredients (conventional additives, coloring fillers, foaming agent and vulcanizing system) according to a method as will be described hereinafter.

| Ingredient | Parts by weight |
|---|---|
| Calcined clay* | 90 |
| Process oil (paraffin type) | 20 |
| TiO$_2$ (rutile type) | 10 |
| Zinc oxide | 5 |
| Stearic acid | 1 |
| Diethylene glycol | 1 |
| Dehydrating agent (CaO) | 5 |
| Vulcanization accelerator MBT | 1 |
| Vulcanization accelerator TMTD | 1 |
| Vulcanization accelerator ZnBDC | 1.5 |
| Sulfur | 2 |
| Foaming agent (OBSH) | 4 |

*Satintone No. 1 (manufactured by Engelhand Mineral & Chem.)

In each of Experiment Nos. 1-6 and Comparative Experiment Nos. 1-5, the material (EPDM alone or a blend of EPDM with Composition A) was kneaded for 5 minutes at 100°-120° C. with 8 inch rolls at 20/25 rpm and a nip of 1 mm. After adjusting the nip to 3 mm, the above mentioned additives and fillers were compounded and the mixture was kneaded for 15 minutes. The roll temperature was cooled at 50° C. and the mixture was then compounded with the vulcanizing system (sulfur and the vulcanization accelerators) and the foaming agent in 3-5 minutes at a nip of 3 mm. The roll nip was adjusted to 0.5 mm and the mixture was thinly passed therethrough twice. The roll nip was again adjusted to 3 mm and the mixture was taken out portionwise.

The rubbery compounds thus extruded were colored in white due to the white fillers. These rubbery compounds were used as samples for checking extrusive processability and subjected to measurement of their Mooney viscosities and extrusion characteristics. A result of the measurement carried out in the same manner as described in Example 1 (ASTM D-2330) was quite identical with that shown in Table 1.

(2) Weather resistance of the colored rubbery compounds after foaming and curing:

The colored rubbery compounds were extruded under the above described extrusion conditions with a flat die (2 mm in thickness and 30 mm in width) into strip specimen which were then foamed and cured in a hot blast at 200° C. for 15 minutes. Table 4 shows a result of the measurement of weather resistance made on these strip specimen.

TABLE 4

| | Exp. No. | | | | | | Comparative Exp. No. | | | | |
|---|---|---|---|---|---|---|---|---|---|---|---|
| | 1 | 2 | 3 | 4 | 5 | 6 | 1 | 2 | 3 | 4 | 5 |
| Tension test (JIS K-6301) | | | | | | | | | | | |
| $M_{100}$ (kg/cm$^2$) | 7 | 6 | 6 | 6 | 6 | 6 | 5 | 6 | 6 | 5 | 6 |
| $T_B$ (kg/cm$^2$) | 27 | 26 | 24 | 22 | 19 | 16 | 21 | 20 | 21 | 23 | 20 |
| $E_B$ (%) | 360 | 330 | 280 | 250 | 170 | 140 | 390 | 380 | 390 | 400 | 400 |
| Density (g/cm$^3$) | 0.67 | 0.65 | 0.63 | 0.60 | 0.55 | 0.50 | 0.70 | 0.71 | 0.71 | 0.70 | 0.71 |
| Weather resistance test[1] | | | | | | | | | | | |
| $\Delta T_B$ (%) | −21 | −18 | −3 | 0 | +6 | +10 | −35 | −33 | −42 | −33 | −36 |
| $\Delta E_B$ (%) | −23 | −20 | −11 | −5 | 0 | +4 | −40 | −31 | −43 | −28 | −41 |
| Weather resistance test[2] | | | | | | | | | | | |
| $\Delta T_B$ (%) | −25 | −17 | +4 | +7 | +11 | +24 | −34 | −33 | −39 | −32 | −35 |

TABLE 4-continued

| | Exp. No. | | | | | | Comparative Exp. No. | | | | |
|---|---|---|---|---|---|---|---|---|---|---|---|
| | 1 | 2 | 3 | 4 | 5 | 6 | 1 | 2 | 3 | 4 | 5 |
| $\Delta E_B$ (%) | −38 | −34 | −25 | −14 | 0 | +3 | −52 | −46 | −55 | −44 | −52 |

Remarks:
[1] a WEL-SUN-HCE type weather meter (manufactured by Suga Test Instruments Co., Japan): wet method, 200 hour irradiation
[2] a UV-fade-o-meter FAL-3 Model (manufactured by Suga Test Instruments Co., Japan): 200 hour irradiation (3) Manufacture of the extruded rubbery products with suede-like appearance of this invention:

A carbon black-incorporated EPDM compound having the same composition as described in Example 1(6) was used for a black rubber as the substrate, while the colored rubbery compounds of Experiment Nos. 1–6 and Comparative Experiment Nos. 1–5 referred to in the preceding (1) were used for a colored rubber as the colored thin layer. Using the same crosshead-type extruder as described in Example 1(6), the carbon black-incorporated EPDM compound and the colored rubbery compounds were extruded under the same conditions as described in Example 1(6) to yield extruded rubbery products with white-colored rubbery thin layers integrally formed on the black substrate thereof. The extruded products were then allowed to stand in a hot air at 200° C. for 20 minutes to effect foaming and curing of the thin layer and curing of the substrate.

The extruded rubbery articles thus obtained have a foamed smooth white-colored rubbery thin layer integrally formed on the surface thereof. By polishing the foamed smooth surface of the articles carefully with an abrasive so as to remove only the skin of the foamed thin layer, the extruded product with the smooth surface are modified to have a colored suède-like (or buckskin-like) appearance.

(4) Thickness and adhesiveness of the colored rubbery thin layer:

In each case of using the colored rubbery compounds of Experiment Nos. 1–6 and Comparative Experiment Nos. 1–5, the extruded product with the foamed smooth surface was examined to check (a) the thickness of the foamed and white-colored smooth thin layer and (b) adhesiveness of the foamed and white-colored thin layer to the black-colored rubbery substrate.

(a) Thickness of the foamed and colored smooth thin layer:

The thickness of the foamed and white-colored smooth thin rubbery layer integrally formed on the surface of the black-colored rubbery substrate was as shown in Table 5.

TABLE 5

| Colored rubbery com- pound | Experiment Nos. | | | | | | Comparative Experiment Nos. | | | | |
|---|---|---|---|---|---|---|---|---|---|---|---|
| | 1 | 2 | 3 | 4 | 5 | 6 | 1 | 2 | 3 | 4 | 5 |
| Thickness of the foamed and colored thin layer | 1.0 | 0.9 | 0.8 | 0.6 | 0.6 | 0.5 mm | 3.5 | 3.2 | 3.3 | 3.0 | 3.2 mm |

In case of using the colored rubbery compounds of Experiment Nos. 1–6, the foamed layer in the extruded product could be as thin as 1 mm or less. In case of using the colored rubbery compounds of Comparative Experiment Nos. 1–5, however, the white-colored layer could not be extruded with a thickness less than 1 mm already before foaming.

(b) Adhesiveness of the foamed and colored smooth thin layer to the rubbery substrate:

In all of the cases of using the colored rubbery compounds of Experiment Nos. 1–6 and Comparative Experiment Nos. 1–5, adhesiveness of the foamed and white-colored smooth thin layer to the black-colored rubbery substrate was outstanding so that any delamination or ply separation was not observed on adhesion tests.

(5) Bending test of the extruded products after weathering action:

In each sample of the extruded products, the smooth skin of the foamed and colored surface of the thin layer was carefully polished and rubbed off with a sand paper (#100) so that the products having a smooth foamed surface was modified to have a colored suède-like appearance. The sample thus treated was subjected to a weather-resistance test and then to a bending test where the sample was bent at an angle of 90° to check whether cracks were formed in the thin layer or not. The weather-resistance test itself was conducted in the same manner as described in Example 1. In this bending test, no crack was observed in the products obtained in case of using the colored rubbery compounds of Experiment Nos. 1–6. This apparently means that the products of this invention are excellent in flexibility even after exposure to weathering action. Contrary to this, the formation of cracks was observed in all of the products obtained in case of using the colored rubbery compounds of Comparative Experiment Nos. 1–5.

It is understood that the preceding representative examples may be varied within the scope of the present invention, both as to the components and conditions, by those skilled in the art to achieve essentially the same results.

As many apparently widely different embodiments of the present invention may be made without departing from the spirit and scope thereof, it is to be construed that the present invention is not limited to the specific embodiments thereof except as defined in the appended claims.

What is claimed is:

1. A weather-resisting extruded rubbery article based on a carbon black-incorporated EPDM rubber substrate having on the surface thereof a thin, smooth layer of a colored rubbery material of a smooth or suede-like appearance integrally formed on the substrate by extrusion molding, wherein the colored rubbery material has been derived from 75–0% by weight of EPDM rubber and 25–100% by weight of a graft copolymer of EPDM rubber and vinyl chloride together with one or more coloring fillers.

2. A weather-resisting extruded rubbery article according to claim 1, wherein the EPDM content of the graft copolymer is 4–60% by weight.

3. A weather-resisting extruded rubbery article according to claim 1, wherein the coloring fillers are selected from inorganic and organic pigments possessing good resistance to weathering action, heat and chemicals.

4. A weather-resisting extruded rubbery article according to claim 1, wherein the thin layer is as thin as 1 mm or less.

5. A flexible, weather-resistant co-extruded rubbery article having a carbon black-containing EPDM rubber as the substrate and on the surface thereof a co-extruded thin, smooth layer of a colored rubbery material having a smooth or suede-like appearance integral with the substrate, the colored rubbery material comprising, in weight percent:
EPDM rubber: about 75 to 0%, and,
a graft polymer: about 25 to 100% of EPDM and vinyl chloride together with at least one coloring filler, the graft polymer containing from about 4 to about 60% vinyl chloride.

6. The flexible, weather-resistant co-extruded rubbery article of claim 5 in which the layer of colored rubbery material is at most about 1.0 mm thick.

7. The flexible, weather-resistant co-extruded rubbery article of claim 6 in which the layer of colored rubbery material has a thickness from about 0.3 to about 1.0 mm.

8. The flexible, weather-resistant co-extruded rubbery article of claim 5 in which the colored rubbery material also includes a plasticizer, stabilizer, vulcanizing agent, vulcanization accelerator or UV-absorbing agent.

* * * * *